UNITED STATES PATENT OFFICE.

ERNST ZÜHL, OF BERLIN, GERMANY.

PYROXYLIN COMPOUND.

SPECIFICATION forming part of Letters Patent No. 700,884, dated May 27, 1902.

Application filed November 17, 1900. Serial No. 36,860. (No specimens.)

*To all whom it may concern:*

Be it known that I, ERNST ZÜHL, doctor of philosophy, a subject of the German Emperor, residing at 95 Belle-Alliancestrasse, Berlin, in the Empire of Germany, have invented a new and useful Pyroxylin or Nitrocellulose Composition, of which the following is a specification.

My composition consists of the following ingredients: first, pyroxylin or nitrocellulose; second, compound esters of carbonic acid and monoöxygenated hydrocarbons of the aromatic series (consisting, essentially, of diphenylcarbonate, tricresylcarbonate, and trinaphthylcarbonate,) which esters having the property of dissolving pyroxylin or nitrocellulose well can be used as substitutes for camphor in the manufacture of celluloid.

*Examples.*

1. Pyroxylin or nitrocellulose, two kilograms; diphenylcarbonate, one kilogram.
2. Pyroxylin or nitrocellulose, two kilograms; tricresylcarbonate, one kilogram.
3. Pyroxylin or nitrocellulose, two kilograms; trinaphthylcarbonate, one kilogram.

The proportions in which both ingredients are contained in the composition may be varied and depend on the property, which would be obtained in the finished product.

The properties of the new composition are similar to those of the known pyroxylin or nitrocellulose composition containing camphor; but the new composition is odorless and less combustible.

What I claim is—

A new pyroxylin or nitrocellulose composition containing pyroxylin or nitrocellulose with a compound ester of carbonic acid and monoöxygenated hydrocarbon of the aromatic series (of the group including diphenylcarbonate, tricresylcarbonate, and trinaphthylcarbonate.)

Signed this 2d day of November, 1900, at Berlin.

ERNST ZÜHL.

Witnesses:
    WOLDEMAR HAUPT,
    HENRY HASPER.